United States Patent
Hashemi et al.

(10) Patent No.: US 10,034,253 B2
(45) Date of Patent: Jul. 24, 2018

(54) CELL SEARCH PROCEDURE FRAME FORMAT

(71) Applicant: Telefonaktiebolaget L M Ericsson (publ), Stockholm (SE)

(72) Inventors: Mona Hashemi, Göteborg (SE); Jingya Li, Gothenburg (SE); Emil Ringh, Stockholm (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 14/718,803

(22) Filed: May 21, 2015

(65) Prior Publication Data

US 2016/0142989 A1 May 19, 2016

Related U.S. Application Data

(60) Provisional application No. 62/080,803, filed on Nov. 17, 2014.

(51) Int. Cl.
*H04J 3/06* (2006.01)
*H04W 56/00* (2009.01)
(Continued)

(52) U.S. Cl.
CPC ....... *H04W 56/001* (2013.01); *H04J 11/0069* (2013.01); *H04L 27/2655* (2013.01); *H04W 72/042* (2013.01)

(58) Field of Classification Search
CPC ............. H04J 11/0069; H04W 72/042; H04W 56/001; H04L 27/2655
(Continued)

(56) References Cited

U.S. PATENT DOCUMENTS

2010/0182903 A1   7/2010 Palanki et al.
2010/0279707 A1*  11/2010 Fischer .................. G01S 5/021
                                              455/456.1
(Continued)

FOREIGN PATENT DOCUMENTS

WO    WO 2012/165904 A2    12/2012

OTHER PUBLICATIONS

Henrik Sahlin et al., patent application entitled, "Cell Search Procedure Frame Format," U.S. Appl. No. 14/541,922, filed Nov. 14, 2014; 49 pages.
(Continued)

*Primary Examiner* — Sai Ming Chan
(74) *Attorney, Agent, or Firm* — Baker Botts, LLP

(57) ABSTRACT

According to some embodiments, a method of synchronizing a wireless device with a network node comprises receiving a radio subframe transmitted from the network node. The radio subframe comprises a first Primary Synchronization Signal (PSS) associated with a first Orthogonal Frequency Division Multiplexing (OFDM) symbol and a first plurality of subcarriers. The first PSS is paired with a first Secondary Synchronization Signal (SSS) associated with a second OFDM symbol and the first plurality of subcarriers. The radio subframe also comprises a second PSS associated with the first OFDM symbol and a second plurality of subcarriers. The second PSS is paired with a second SSS associated with the second OFDM symbol and the second plurality of subcarriers. The method further comprises inspecting the first plurality of subcarriers to detect the first PSS and the first SSS and inspecting the second plurality of subcarriers to detect the second PSS and the second SSS. Upon detecting at least one of the first PSS and the first SSS or the second PSS and the second SSS, the method determines system information associated with the network node based on the detected at least one PSS and the detected at least one SSS.

20 Claims, 14 Drawing Sheets

(51) Int. Cl.
*H04W 72/04* (2009.01)
*H04J 11/00* (2006.01)
*H04L 27/26* (2006.01)

(58) Field of Classification Search
USPC .................................................... 370/350
See application file for complete search history.

(56) References Cited

U.S. PATENT DOCUMENTS

| | | | |
|---|---|---|---|
| 2011/0243104 A1 | 10/2011 | Swarts et al. | |
| 2012/0307726 A1 | 12/2012 | Pi et al. | |
| 2013/0094411 A1 | 4/2013 | Zhang | |
| 2013/0176952 A1* | 7/2013 | Shin | H04L 5/001 370/329 |
| 2013/0229953 A1* | 9/2013 | Nam | H04W 72/0426 370/280 |
| 2013/0235851 A1 | 9/2013 | Abu-Surra | |
| 2014/0050206 A1* | 2/2014 | Seo | H04J 11/0069 370/336 |
| 2014/0204826 A1 | 7/2014 | Ekpenyong | |
| 2015/0055574 A1 | 2/2015 | Kim | |
| 2015/0296518 A1* | 10/2015 | Yi | H04L 5/0048 370/329 |
| 2016/0066291 A1* | 3/2016 | Awad | H04B 7/2656 370/350 |
| 2016/0127098 A1* | 5/2016 | Ng | H04L 5/0048 370/329 |

OTHER PUBLICATIONS

Emil Ringh et al., patent application entitled, "Cell Search Procedure Frame Format," U.S. Appl. No. 14/697,408, filed Apr. 27, 2015, 43 pages.

C. Nicolas Barati et al., "Directional Cell Search for Millimeter Wave Cellular Systems," arXiv:1404.5068v1 [cs.IT], Apr. 20, 2014, 10 pages.

S. Rangan et al., "Millimeter Wave Cellular Wireless Networks: Potentials and Challenges," xrXiv:1401.2560v1 [cs.NI] Jan. 11, 2014, 17 pages.

Technical Specification, ESI, "LTE: Evolved Universal Terrestrial Radio Access (E-UTRA); Physical channels and modulation (3GPP TS 36.211 version 11.2.0 Release 11)," ETSI TS 136 211 V11.2.0 (Apr. 2013); European Telecommunications Standards Institute 2013; 110 pages.

Technical Specification, "LTE, 3rd Generation Partnership Project; Technical Specification Group Radio Access Network; Evolved Universal Terrestrial Radio Access (E-UTRA); Physical layer procedures (Release 12)," 3GPP TS 36.213 V12.1.0 (Mar. 2014), 2014, 3GPP Organizational Partners (ARIB, ATIS, CCSA, ETSI, TTA, TIC); 186 pages.

PCT, Notification of Transmittal of the International Search Report and the Written Opinion of the International Searching Authority, or the Declaration, Application No. PCT/IB2015/056441, dated Nov. 20, 2015.

PCT Notification of Transmittal of the International Search Report and the Written Opinion of the International Searching Authority, or the Declaration for International application No. PCT/IB2015/054245, dated Sep. 29, 2015.

Office Action Summary Issued by USPTO for U.S. Appl. No. 14/697,408, filed Apr. 27, 2015; Applicants: Ringh et al.—dated Oct. 6, 2016.

Dahlman et al., 4G: LTE/LTE-Advanced for Mobile Broadband, 2nd Edition, Hardcover ISBN: 9780124199859, eBook ISBN: 9780124199972, © Academic Press 2014, (book cover, first page, copyright page, Section 14.1—Acquisition and cell search, 14.1.1, 14.1.2 and 14.1.3), Published Date: Oct. 29, 2013.

Henrik Sahlin et al., U.S. Appl. No. 14/541,922, Non-Final Rejection, dated Mar. 23, 2017.

USPTO, Final Office Action for U.S. Appl. No. 14/697,408, dated May 8, 2017.

* cited by examiner

| Channel bandwidth [MHz] | 1.4 | 3 | 5 | 10 | 15 | 20 |
|---|---|---|---|---|---|---|
| Transmission bandwidth in terms of resource block | 6 | 15 | 25 | 50 | 75 | 100 |
| Number of new proposed PSS or SSS transmissions in one OFDM symbol | 0 | 2 | 4 | 8 | 12 | 16 |
| Number of of resource blocks allocated to new proposed PSS or SSS transmissions | 0 | 2x6 = 12 | 4x6 = 24 | 8x6 = 48 | 12x6 = 72 | 16x6 = 96 |

Fig. 5

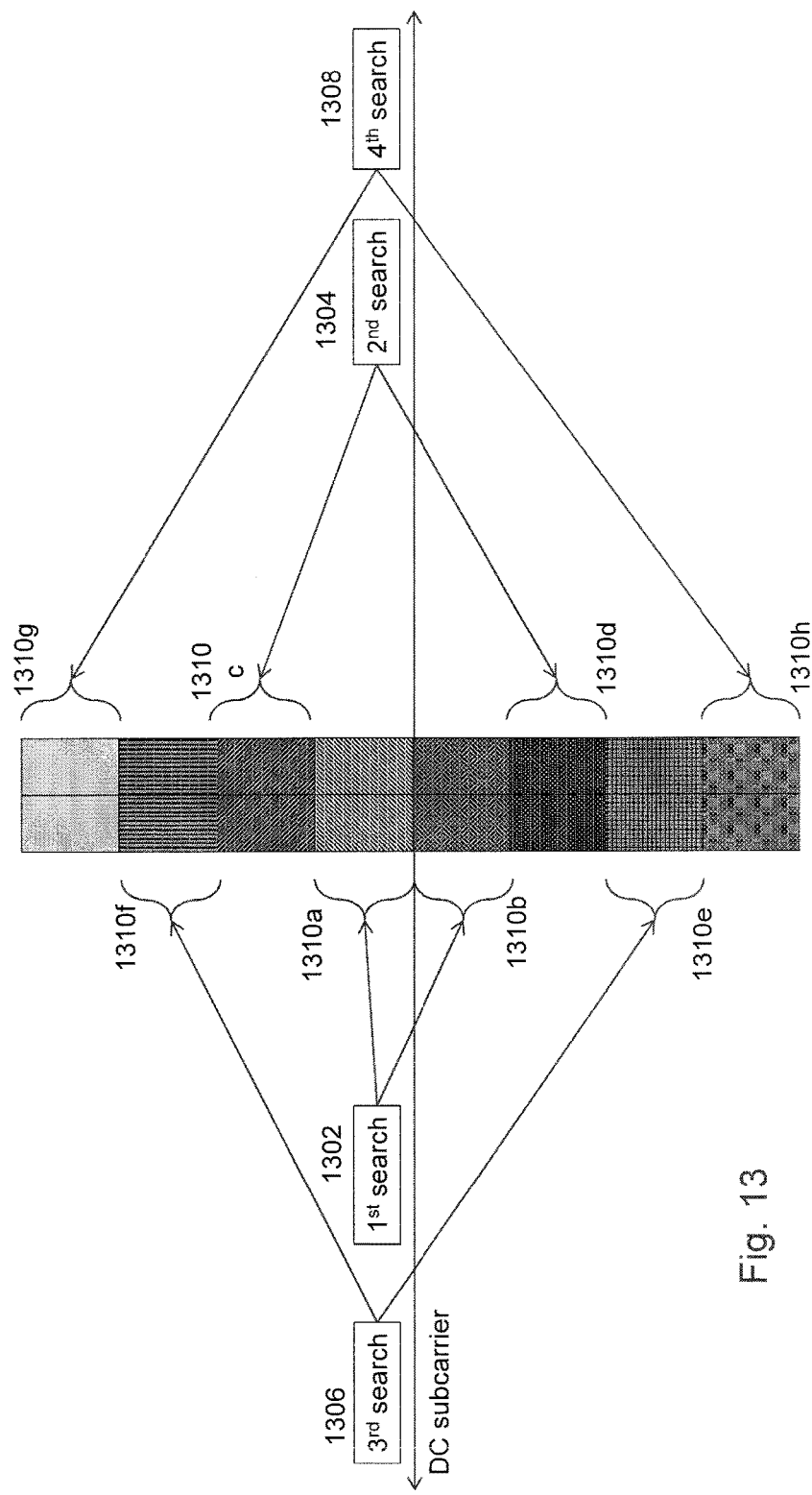

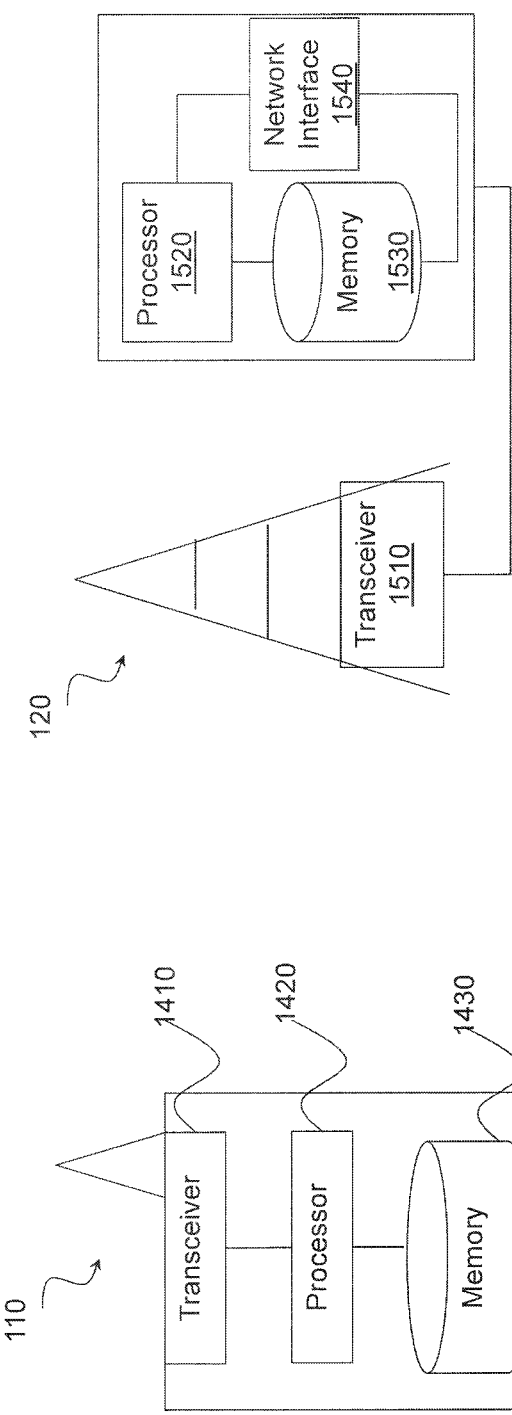

CELL SEARCH PROCEDURE FRAME FORMAT

RELATED APPLICATION

This application claims benefit under 35 U.S.C. § 119(e) to U.S. Provisional Application Ser. No. 62/080,803, entitled "CELL SEARCH PROCEDURE FRAME FORMAT," filed Nov. 17, 2014, the entire content of which is incorporated herein by reference.

TECHNICAL FIELD

Particular embodiments relate generally to synchronization signals in wireless communications, and more particularly to frame formats for cell search procedure synchronization signals.

BACKGROUND

When a wireless device powers on or moves between cells in a wireless network, the wireless device receives and synchronizes to downlink signals in a cell search procedure. The cell search procedure identifies a preferable cell and performs time and frequency synchronization to the network in downlink (e.g., from a base station to a user equipment).

A user equipment (UE) may use primary and secondary synchronization signals (PSS and SSS), such as those described in Section 6.11 of Third Generation Partnership Project (3GPP) TS 36.211, version 11.2.0, for performing a cell search procedure, such as the cell search procedure described in Section 4.1 of 3GPP TS 36.213, version 12.1.0.

FIG. 1 illustrates an example radio frame and locations of OFDM symbols used for PSS and SSS, according to a 3GPP specification. The X-axis represents orthogonal frequency division multiplexing (OFDM) symbols 112 and the Y-axis represents subcarriers 114. Each resource element 113 corresponds to one OFDM subcarrier 114 during one OFDM symbol interval 112. Particular OFDM symbols 112 include PSS 116 and SSS 118.

3GPP specifies that for frequency division duplex (FDD) PSS 116 is mapped to the central 6 resource blocks (RBs) (using the central 72 subcarriers) in the last symbol of time slots 0 and 10 within a radio frame and the SSS is transmitted in the OFDM symbol preceding PSS, such as illustrated in FIG. 1.

3GPP specifies that for time division duplex (TDD) PSS is mapped to 6 RBs (using the central 72 subcarriers) in the third symbol of time slot 2 (subframe 1) and the third symbol of time slot 12 (subframe 6) within a radio frame and the SSS is transmitted in the last OFDM symbol of slots 1 and 11 (i.e., three symbols ahead of the PSS).

The SSS and PSS have the same frequency mapping for both FDD and TDD, but in different OFDM symbols. In the frequency domain, 3GPP specifies that the PSS and SSS are transmitted in the central subcarriers irrespective of the system bandwidth, which allows the UE to synchronize to the network without prior knowledge of the allocated system bandwidth. The synchronization sequences use 62 subcarriers in total (with 31 subcarriers mapped on each side of DC subcarrier) extended with five zeroes at the edge and mapped to the center 73 subcarriers. The DC subcarrier is not used for transmitting signals.

FIG. 2 illustrates an example of an initial cell search procedure. A UE typically may have a frequency error of 2 to 20 ppm (part per million) at power on. This corresponds to 40 to 400 kHz frequency error at a carrier frequency of 2 GHz. The UE then tries to detect a PSS. From the detected PSS, the UE may derive the cell id within a cell-identity group, which consists of three different cell identities corresponding to three different PSS. To perform the detection, the UE searches for all of the three possible cell identities. The UE may also determine an OFDM symbol synchronization and a coarse frequency offset estimation with an accuracy of about 1 kHz. The UE estimates the latter by evaluating several hypotheses of the frequency error.

The UE then detects the SSS. From the detected SSS, the UE acquires the physical cell id and achieves radio frame synchronization. The UE also detects whether the cyclic prefix length is normal or extended. A UE that is not preconfigured for a particular duplex mode (e.g., TDD or FDD) may detect the duplex mode by the frame position of the detected SSS in relation to the detected PSS. The UE may estimate fine frequency offset by correlating PSS and SSS. Alternatively, the UE may use cell-specific reference signals (CRS) to estimate fine frequency offset.

After synchronizing with the PSS and the SSS, the UE may receive and decode cell system information, which contains cell configuration parameters such as the Physical Broadcast Channel (PBCH). The number of OFDM symbols used for PDCCH (Physical Downlink Control Channel) is signaled by PCFICH (Physical Control Format Indicator Channel) according to Section 6.7 of 3GPP TS 36.211, version 11.2.0. The PCFICH is decoded before the UE receives PDCCH. The number of OFDM symbols signaled by PCFICH may be 1, 2 or 3 for large bandwidth allocations (e.g., more than 10 resource blocks) and 2, 3 or 4 OFDM symbols for small bandwidths (e.g., less than or equal to 10 resource blocks). The first OFDM symbols of a subframe are used for PDCCH.

Section 6.10.1 of 3GPP TS 36.211, version 11.2.0, illustrates CRS mappings for one, two, and four antenna ports. As illustrated in the 3GPP specification, CRS are not mapped on the same OFDM symbols as used for PSS and SSS.

SUMMARY

According to some embodiments, a method of synchronizing a wireless device with a network node comprises receiving, at the wireless device, a radio subframe transmitted from the network node. The radio subframe comprises a first Primary Synchronization Signal (PSS) associated with a first Orthogonal Frequency Division Multiplexing (OFDM) symbol and a first plurality of subcarriers. The first PSS is paired with a first Secondary Synchronization Signal (SSS) associated with a second OFDM symbol and the first plurality of subcarriers. The radio subframe also comprises a second PSS associated with the first OFDM symbol and a second plurality of subcarriers. The second PSS is paired with a second SSS associated with the second OFDM symbol and the second plurality of subcarriers. The method further comprises inspecting the first plurality of subcarriers to detect the first PSS and the first SSS and inspecting the second plurality of subcarriers to detect the second PSS and the second SSS. Upon detecting at least one of the first PSS and the first SSS or the second PSS and the second SSS, the method determines system information associated with the network node based on the detected at least one PSS and the detected at least one SSS.

In particular embodiments, the radio subframe comprises subcarriers centered around a DC subcarrier. The first plurality of subcarriers comprises a plurality of subcarriers adjacent to and above the DC subcarrier, and the second plurality of subcarriers comprise a plurality of subcarriers adjacent to and below the DC subcarrier.

In particular embodiments, the radio subframe further comprises a third PSS associated with the first OFDM symbol and a third plurality of subcarriers. The third PSS is paired with a third SSS associated with the second OFDM symbol and the third plurality of subcarriers. A fourth PSS is associated with the first OFDM symbol and a fourth plurality of subcarriers. The fourth PSS is paired with a fourth SSS associated with the second OFDM symbol and the fourth plurality of subcarriers. The method further comprises inspecting the third plurality of subcarriers to detect the third PSS and the third SSS and inspecting the fourth plurality of subcarriers to detect the fourth PSS and the fourth SSS. Upon detecting at least one of the third PSS and the third SSS or the fourth PSS and the fourth SSS, the method determines system information associated with the network node based on the detected at least one PSS and the detected at least one SSS.

Particular embodiments may exhibit some of the following technical advantages. Particular embodiments may include a PSS and SSS cell search frame format that is backward compatible such that legacy UEs will not detect these cell search signals or need to be aware of their existence. Particular embodiments use synchronization sequences other than those specified in LTE release 12. In particular embodiments, cell search signals are placed in resource blocks that are not scheduled to legacy UEs. In particular embodiments, PSS and SSS frame formats may use a large fraction of the reserved resource blocks which results in low overhead. Particular embodiments may allocate multiple PSS/SSS pairs in adjacent subcarriers such that a high resolution frequency offset estimate can be calculated with low computational complexity.

In particular embodiments, a UE may use accumulation to improve the received SINR. In particular embodiments, a base station may use beamforming or repetition of PSS and SSS in the frequency domain to increase successful cell detection rate and reduce cell detection latency.

In particular embodiments, the same PSS sequence, and thus also detector, may be used irrespective of the position of the PSS within the OFDM symbol. When a PSS sequence is detected, a UE may continue to detect SSS in the OFDM symbol, which is one symbol before the PSS. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which:

FIG. 5 is a table of example numbers of resource blocks allocated to PSS and SSS, according to particular embodiments;

FIG. 13 illustrates an example search method for detecting synchronization signals, according to a particular embodiment;

FIG. 14 is a block diagram illustrating an example embodiment of a wireless device; and FIG. 15 is a block diagram illustrating an example embodiment of a radio network node.

DETAILED DESCRIPTION

Figure 1:
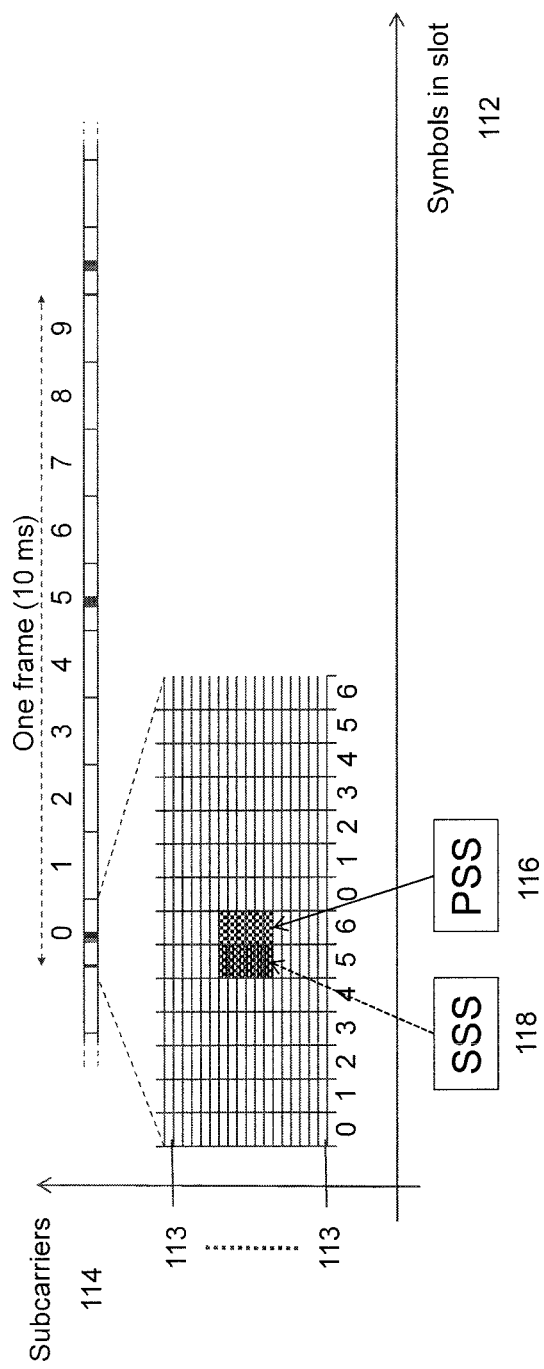
FIG. 1 illustrates an example radio frame and locations of OFDM symbols used for PSS and SSS, according to a 3GPP specification.
Figure 2:
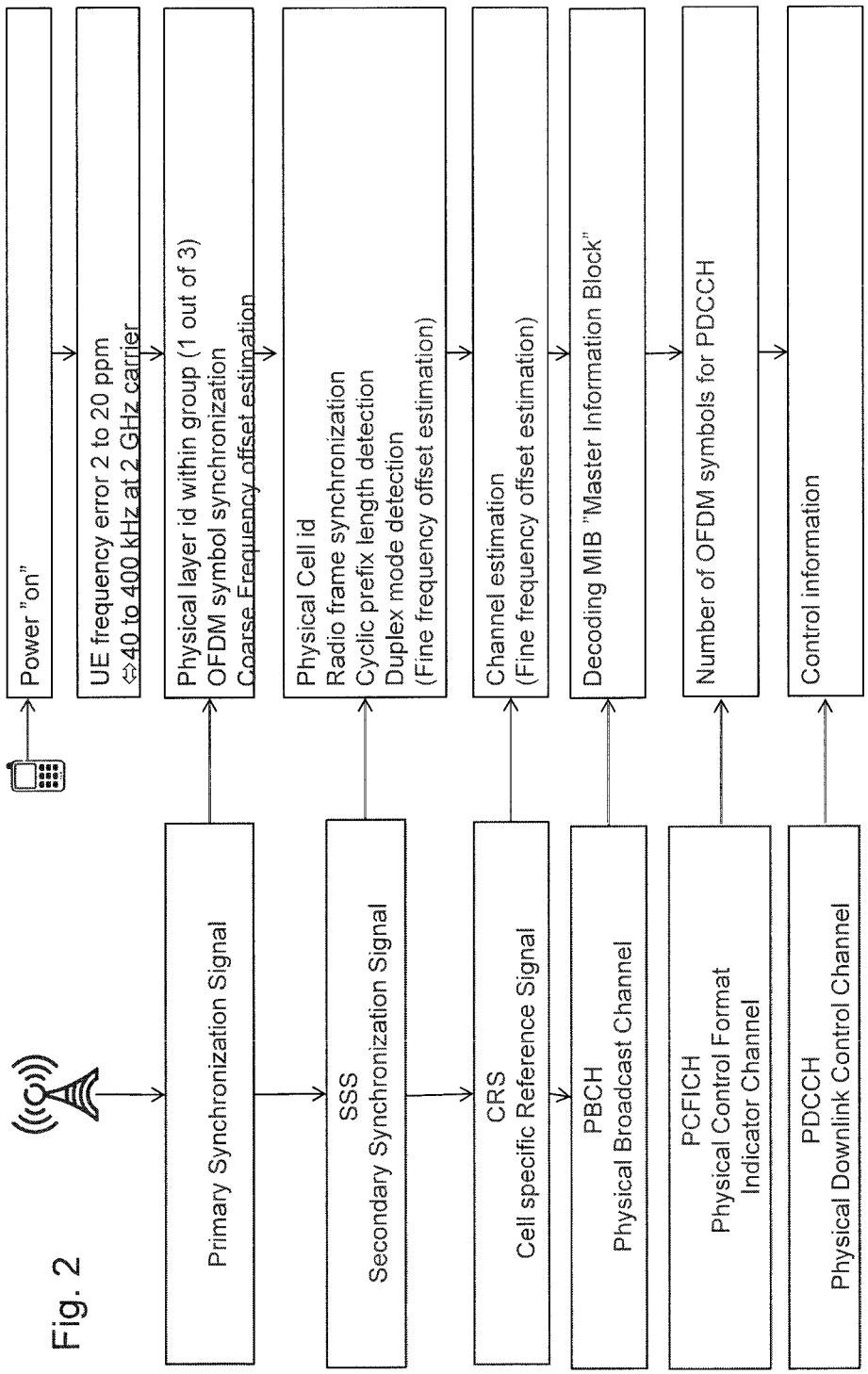
FIG. 2 is a flowchart of an example method for performing cell search synchronization, according to a particular embodiment.

In particular networks, a UE might receive cell search signals at a low signal to interference plus noise ratio (SINR), which results in degraded or impossible cell attachment. 3GPP specifies that the same synchronization signals are transmitted each 5 ms. A UE might attempt to accumulate several occasions of these signals; however, fading radio channel and frequency errors negatively impact this possibility. A fading radio channel exhibits time variations both in amplitude and phase. The speed of these variations depends on both the speed of the UE and how the radio propagation environment is changing. In both cases, these variations may result in received signals that cannot be accumulated coherently in order to increase SINR. The phase variations may lead to a destructive superposition at this accumulation.

Furthermore, frequency error between a base station transmitter and a UE may also result in a channel with large phase variations over time. A UE typically has an oscillator that determines the frequency reference for its receiver with an accuracy of around 20 ppm. With a carrier frequency of 2 GHz, this results in a frequency error of 400 kHz. In order to estimate this frequency error, several PSS detectors could possibly be used in parallel, each with a different hypothesis of the frequency error. With an interval of 5 ms between the PSS transmission, the resolution of these frequency hypothesis signals would need to be $1/(5 \cdot [10]^{(-3)})/100 = 2$ Hz with a required accuracy of one percent. Thus, estimating frequency errors up to 400 kHz is a computationally complex solution.

An alternative may be for a UE to use a non-coherent accumulation in its receiver. Non-coherent accumulation, however, does not increase the SINR. It only improves the statistics of the receiver (i.e., the sensitivity to variations in individual noise samples).

A particular technique to improve coverage of cell search signals uses several antenna elements and beamforming to improve the SINR. A directional cell search procedure is proposed by C. Nicolas Barati et al. in "Directional Cell Search for Millimeter Wave Cellular Systems", Cornell University Library. In this procedure a base station periodically transmits synchronization signals in random directions to scan the angular space. The need for synchronization and broadcast signals that can be used in the initial cell search for scanning over a range of angles is discussed by Sundeep Rangan et al. in "Millimeter-Wave Cellular Wireless Networks: Potentials and Challenges", Proceedings of the IEEE, Volume: 102, Issue 3, 2014, pages 366-385.

Another technique to improve coverage of cell search signals, as disclosed in U.S. patent application Ser. No. 14/641,922 filed Nov. 14, 2014, includes PSS and SSS formats mapped to additional symbols in the time domain.

When channels are time variant, the embodiments disclosed herein have particular advantages.

An object of the present disclosure is to obviate at least the disadvantages above and provide an improved method to transmit synchronization signals with a density and directionality that enables successful cell search in low SINR environments. Particular embodiments are described with reference to FIGS. 1-15 of the drawings, like numerals being used for like and corresponding parts of the various drawings. LTE is used throughout this disclosure as an example cellular system, but the ideas presented herein apply to other wireless communication systems as well.

Figure 3:
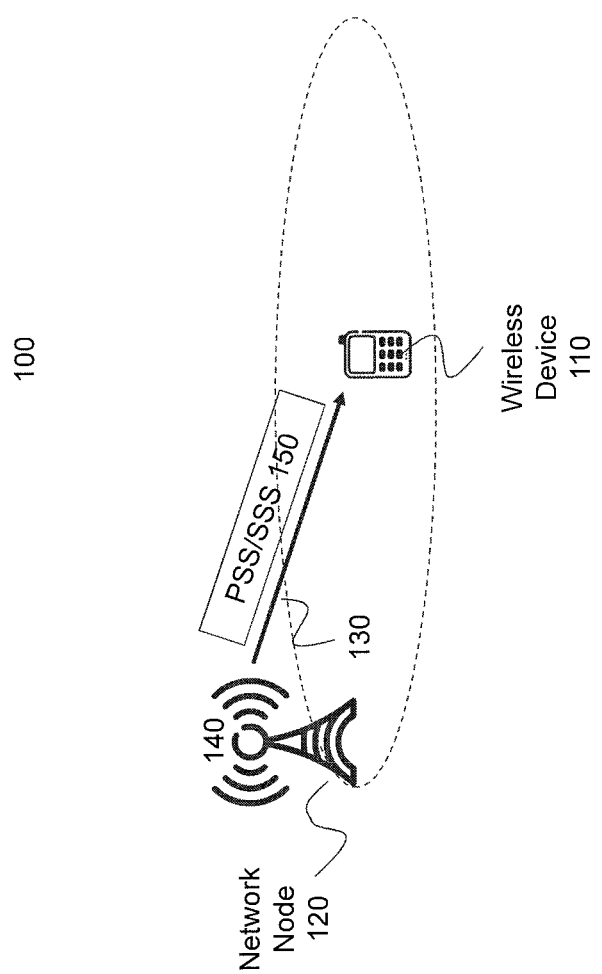
FIG. 3 is a block diagram illustrating an example of a network, according to a particular embodiment.

FIG. 3 is a block diagram illustrating an example of a network, according to a particular embodiment. Network 100 includes radio network node 120 (such as a base station or eNodeB) and wireless devices 110 (such as mobile phones, smart phones, laptop computers, tablet computers, or any other devices that can provide wireless communication). In general, wireless devices 110 that are within coverage of radio network node 120 communicate with radio network node 120 by transmitting and receiving wireless signals 130. For example, wireless devices 110 and radio network node 120 may communicate wireless signals 130 containing voice traffic, data traffic, and/or control signals. Wireless signals 130 may include both downlink transmissions (from radio network node 120 to wireless devices 110) and uplink transmissions (from wireless devices 110 to radio network node 120). Wireless signals 130 may include synchronization signals, such PSS/SSS 150. Wireless device 110 may detect the synchronization signals to determine system information for network 100. Wireless signals 130 comprise radio frames. Particular example formats for these radio frames are illustrated in FIGS. 5-10 described below.

Radio network node 120 transmits and receives wireless signals 130 using antenna 140. In particular embodiments, radio network node 120 may comprise multiple antennas 140. For example, radio network node 120 may comprise a multi-input multi-output (MIMO) system with two, four, or eight antennas 140.

In network 100, each radio network node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 14 below. Similarly, a radio network node may include any suitable combination of hardware and/or software. For example, in particular embodiments, a radio network node, such as radio network node 120, may include the components described with respect to FIG. 15 below.

This disclosure describes several frame formats for transmitting and receiving synchronization signals using LTE as an example. Particular embodiments may be applicable to FDD, TDD, or both. Particular embodiments may apply to all subframes and all subcarriers except the DC subcarrier. In particular embodiments, the PSS and SSS synchronization signals are mapped in the frequency domain and particular embodiments may be dependent on the system bandwidth.

Figure 4:
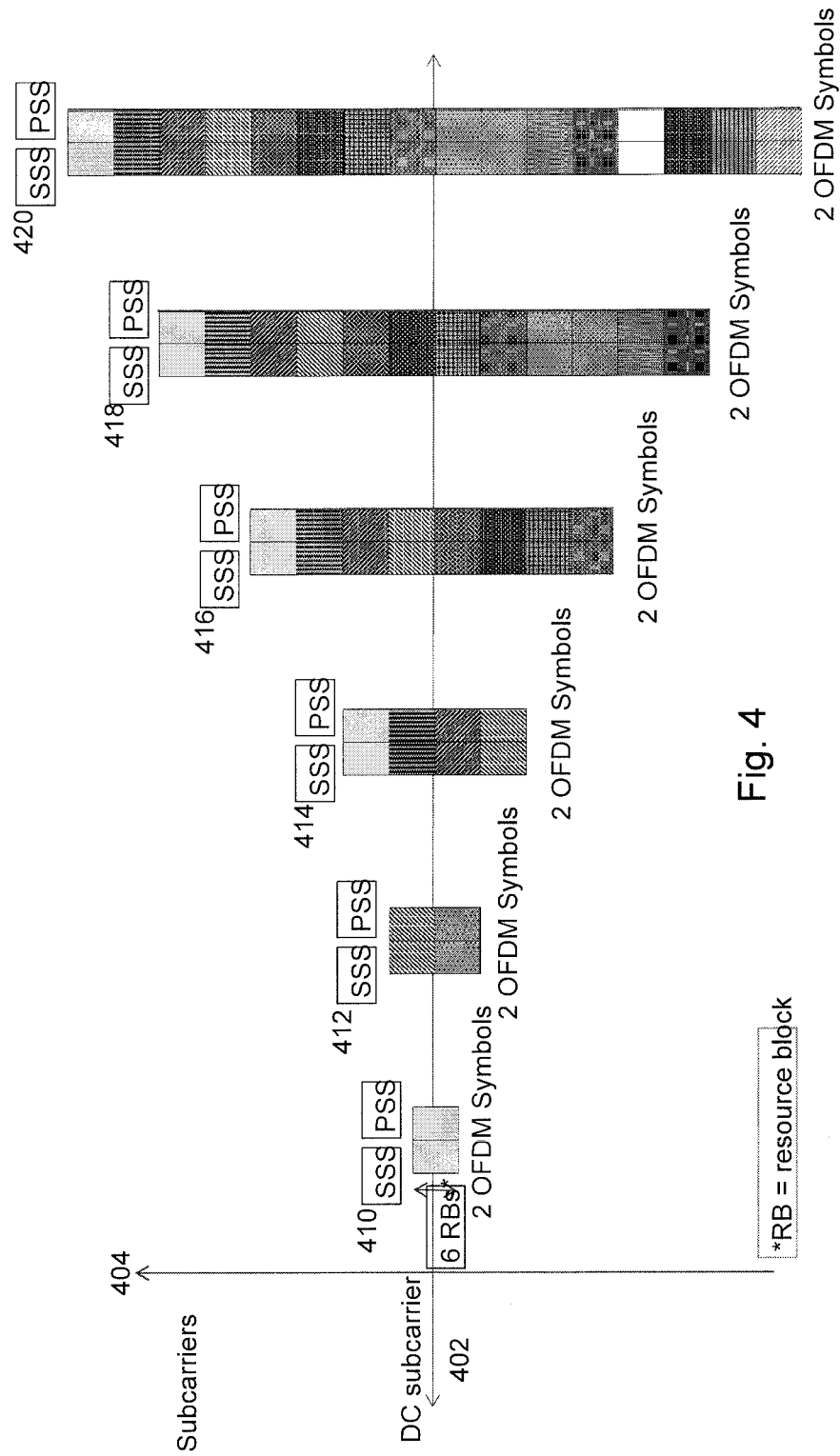
FIG. 4 illustrates example locations of primary and secondary search signals for various bandwidth systems, according to some embodiments.

FIG. 4 illustrates example locations of primary and secondary search signals for various bandwidth systems, according to some embodiments. Horizontal axis 402 represents the DC subcarrier and vertical axis 404 represents the subcarriers above and below the DC subcarrier.

PSS/SSS pair 410 illustrates a legacy PSS/SSS pair. Legacy PSS and SSS are transmitted over 6 resource blocks in the frequency domain and they occupy 1.08 MHz of channel bandwidth. In the frequency domain, legacy PSS/SSS pairs are located around the DC subcarrier and each PSS and SSS sequence occupies 6 resource blocks (6×12=72 subcarriers), as illustrated by example PSS/SSS pair 410.

According to some embodiments, the number of resource blocks allocated to the PSS and SSS transmissions are illustrated as PSS/SSS pairs 412-420. For example, PSS/SSS pairs 412 illustrate an example of two PSS/SSS pairs in a 3 MHz system. A first SSS in a first OFDM symbol is paired with a first PSS in a second OFDM symbol. Both the first PSS and first SSS occupy the first six resource blocks above the DC subcarrier. A second SSS in the first OFDM symbol is paired with a second PSS in the second OFDM symbol. Both the second PSS and second SSS occupy the first six resource blocks below the DC subcarrier.

PSS/SSS pairs 414 illustrate an example of four PSS/SSS pairs in a 5 MHz system. As system bandwidth increases, the number of PSS/SSS pairs may also increase. As illustrated, PSS/SSS pairs 420 represent an example 20 MHz system with 16 PSS/SSS pairs. Although each PSS and SSS is illustrated as occupying six resource blocks, in particular embodiments each PSS and SSS may occupy any suitable number of resource blocks or subcarriers. FIG. 5 illustrates resource block allocations in table form.

FIG. 5 is a table of example numbers of resource blocks allocated to PSS and SSS, according to particular embodiments. As a particular example, a system using 3 MHz of bandwidth may allocate 12 resource blocks, which corresponds to 2 PSS/SSS pairs (e.g., PSS/SSS pairs 412 in FIG. 4). A 5 MHz system may allocate 24 resource blocks corresponding to 4 PSS/SSS pairs (e.g., PSS/SSS pairs 414 in FIG. 4). A 10 MHz system may allocate 48 resource blocks corresponding to 8 PSS/SSS pairs (e.g., PSS/SSS pairs 416 in FIG. 4). A 15 MHz system may allocate 72 resource blocks corresponding to 12 PSS/SSS pairs (e.g., PSS/SSS pairs 418 in FIG. 4). A 20 MHz system may allocate 92 resource blocks corresponding to 16 PSS/SSS pairs (e.g., PSS/SSS pairs 420 in FIG. 4).

FIGS. 6-10 illustrate example locations of primary and secondary search signals within a subframe, according to particular embodiments. As the system bandwidth increases, the number of search signals may also increase.

Figure 6:
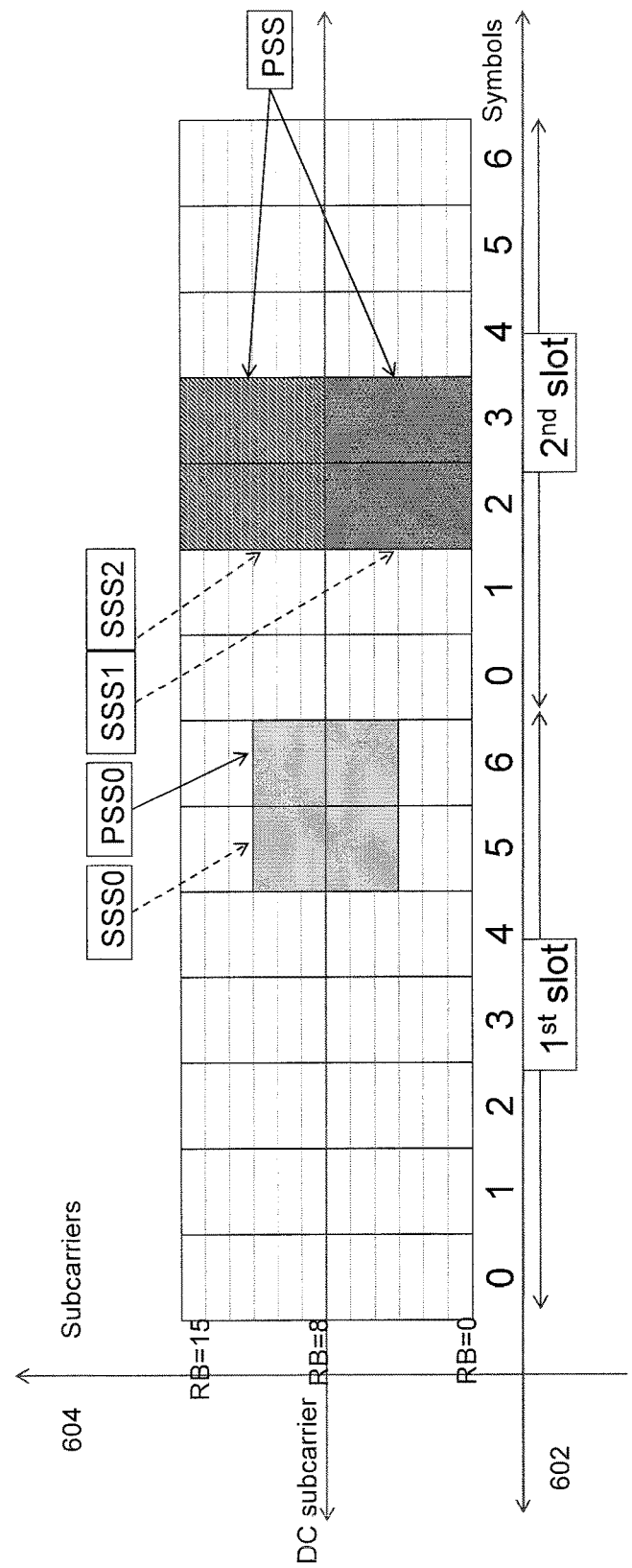
FIGS. 6-10 illustrate example locations of primary and secondary search signals within a subframe, according to particular embodiments.

FIG. 6 illustrates two slots of an example subframe in a 3 MHz FDD system. Each slot comprises a plurality of OFDM symbols, illustrated on horizontal axis 602, and a plurality of subcarriers, illustrated on vertical axis 604.

The illustrated subframe represents subframe 0 or 5 because legacy SSS and PSS (i.e., SSS0 and PSS0) are illustrated in OFDM symbols 5 and 6, respectively. In other embodiments, additional PSS/SSS pairs may be inserted in any subframe, whether the subframe includes legacy PSS/SSS or not.

In the illustrated example, additional PSS/SSS pairs are transmitted in OFDM symbols 2 and 3 of the second time slot. In total, 3 PSS/SSS pairs are included within the subframe (including the legacy pair).

In particular embodiments, the PSS and SSS belonging to the same pair are not placed in different slots. This is because a longer cyclic prefix is used for OFDM symbol 0 as compared to all other OFDM symbols within a slot. In particular embodiments, the subframe number where the PSS and SSS are placed (e.g., subframe 0 or 5 as illustrated), may be fixed such that a UE knows the timing of the start of the frame after detecting both PSS and SSS.

A particular advantage of the illustrated embodiment is that the same PSS sequence, and thus also detector, may be used irrespective of the position of the PSS within the OFDM symbol. When a PSS sequence is detected, a UE may continue to detect SSS in the OFDM symbol, which is one symbol before the PSS.

Legacy SSS and PSS are located at the center subcarriers centered around the DC carrier. In FIGS. 6-10, the legacy PSS and SSS sequences are denoted as PSS0 and SSS0, respectively. Because they are centered around the DC subcarrier, a UE may detect legacy SSS and PSS without knowing the total system bandwidth.

In particular embodiments, additional PSS/SSS pairs may not include the center DC subcarrier. They may occupy the lower and upper part of the subcarriers adjacent to the DC subcarrier. In addition, the number of PSS/SSS pairs may be different for different system bandwidths. Although FIGS. 6-10 illustrate 72 subcarriers (i.e., 6 resource blocks) allocated for each PSS/SSS pair, other embodiments may allocate any suitable number of subcarriers or resource blocks for each PSS/SSS pair.

In particular embodiments of an FDD system, the first OFDM symbol in a PSS/SSS pair is used for SSS and the second for PSS. In particular embodiments this format is advantageous because it mimics the legacy SSS and PSS mapping into a subframe and particular components of a UE implementation may be at least partly reused.

Although the OFDM symbols are adjacent in the illustrated examples, particular embodiments may use any two OFDM symbols in a subframe.

Figure 7:
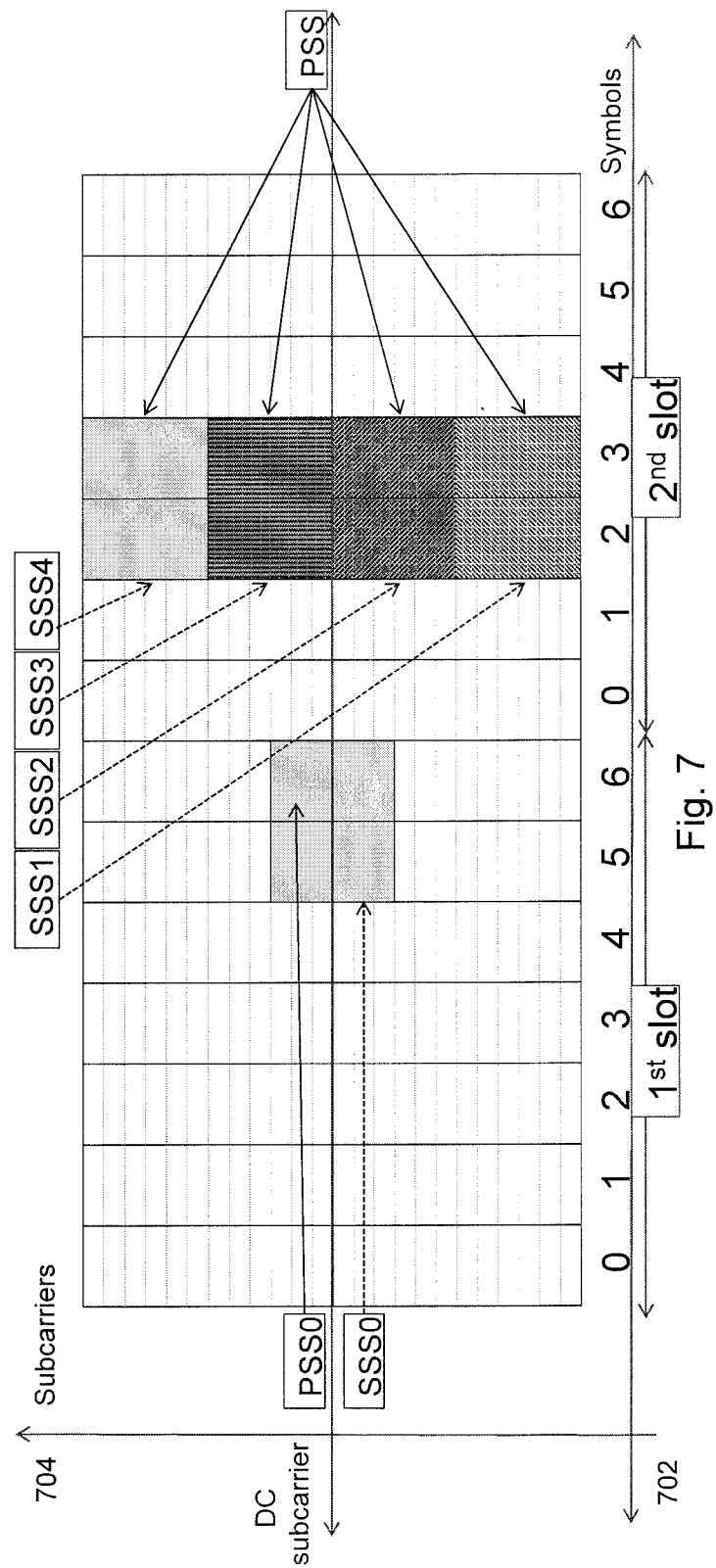

FIG. 7 illustrates two slots of an example subframe in a 5 MHz FDD system. Each slot comprises a plurality of OFDM symbols, illustrated on horizontal axis 702, and a plurality of subcarriers, illustrated on vertical axis 704. FIG. 7 includes four additional PSS/SSS pairs.

In the illustrated embodiment, the legacy pair is located in symbols 5 and 6 of the first slot in subframe 0 or 5. Symbols 2 and 3 of the second slot in either or both subframe 0 and 5 are used for additional PSS/SSS pairs. The assigned resource blocks for the additional PSS/SSS pairs are located around the DC subcarrier in the vicinity of each other. PSS/SSS3 illustrates an example of a first plurality of subcarriers located adjacent to and above the DC subcarrier. PSS/SSS2 illustrates an example of a second plurality of subcarriers located adjacent to and below the DC subcarrier. In particular embodiments, considering the DC subcarrier of the 5 MHz system as a reference point, the frequency location of the 1st and 4th PSS/SSS pairs (PSS/SSS1 and PSS/SSS4) mirror each other. Similarly, the locations of the 2nd and 3rd PSS/SSS pairs (PSS/SSS2 and PSS/SSS3) mirror each other.

Figure 8:
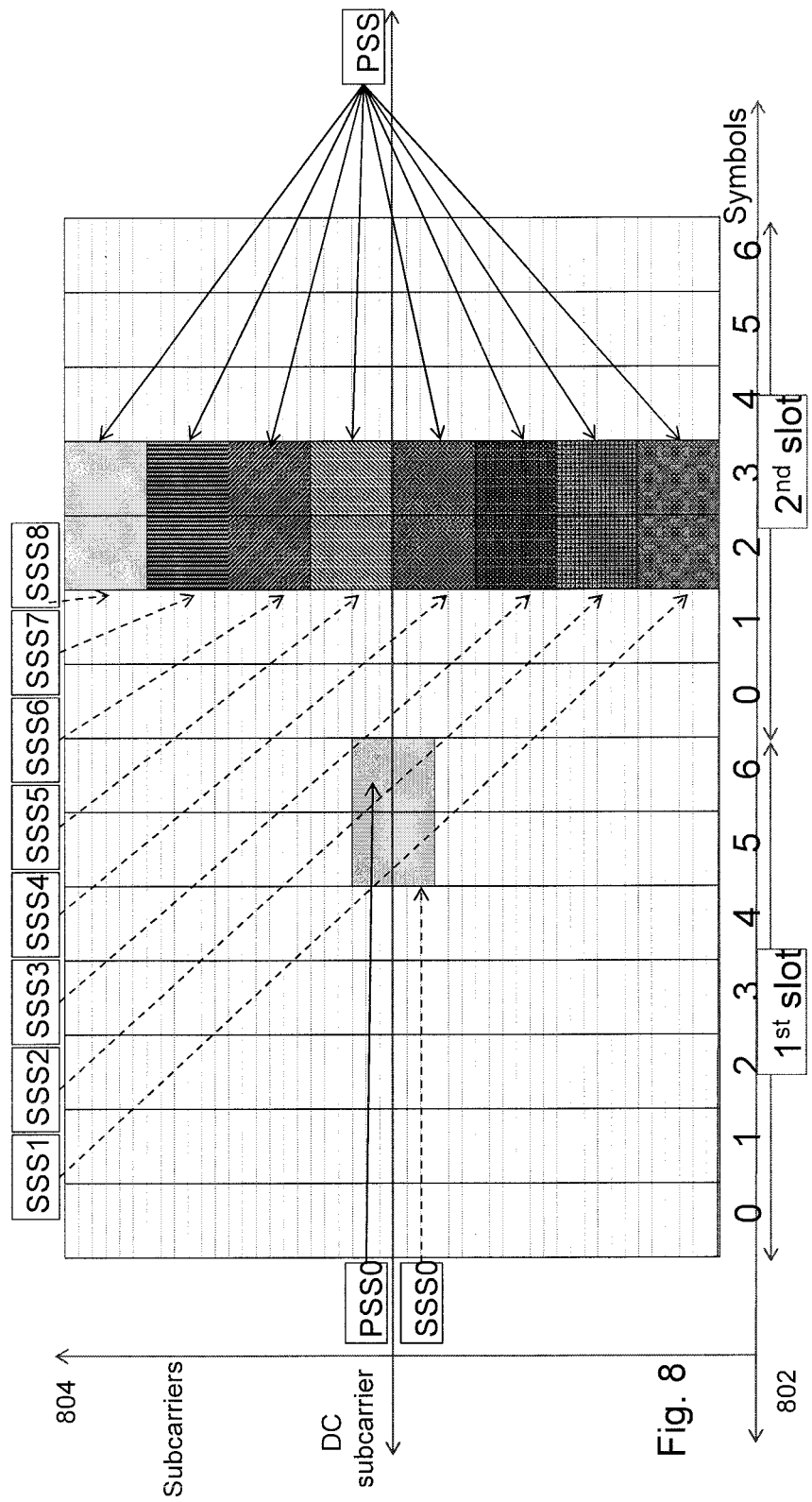

FIG. 8 illustrates two slots of an example subframe in a 10 MHz FDD system. Each slot comprises a plurality of OFDM symbols, illustrated on horizontal axis 802, and a plurality of subcarriers, illustrated on vertical axis 804. FIG. 8 includes eight additional PSS/SSS pairs.

In the illustrated embodiment, eight PSS/SSS pairs are inserted in symbols 2 and 3 of the second slot of either or both subframe 0 and 5. PSS/SSS5 illustrates an example of a first plurality of subcarriers located adjacent to and above the DC subcarrier. PSS/SSS4 illustrates an example of a second plurality of subcarriers located adjacent to and below the DC subcarrier. In particular embodiments, considering the DC subcarrier of the 10 MHz system as a reference point, the frequency locations of the 1st and 8th pairs (PSS/SSS1 and PSS/SSS8), 2nd and 7th pairs (PSS/SSS2 and PSS/SSS7), 3rd and 6th pairs (PSS/SSS3 and PSS/SSS6), and the 4th and 5th pairs (PSS/SSS4 and PSS/SSS5) mirror each other.

Figure 9:
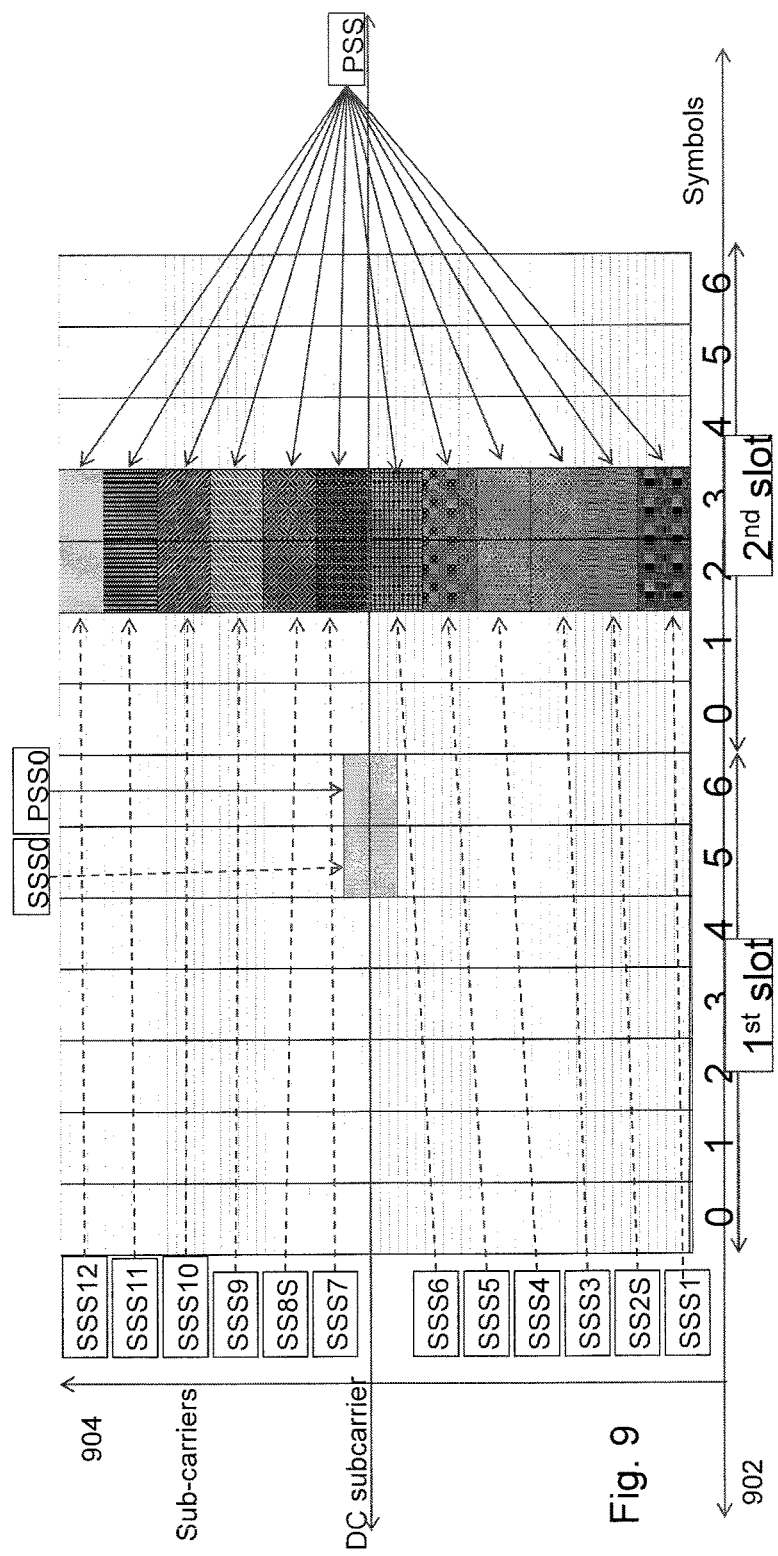

FIG. 9 illustrates two slots of an example subframe in a 15 MHz FDD system. Each slot comprises a plurality of OFDM symbols, illustrated on horizontal axis 902, and a plurality of subcarriers, illustrated on vertical axis 904. FIG. 9 includes twelve additional PSS/SSS pairs.

In the illustrated embodiment, twelve PSS/SSS pairs are inserted in symbols 2 and 3 of the second slot of either or both subframe 0 and 5. PSS/SSS7 illustrates an example of a first plurality of subcarriers located adjacent to and above the DC subcarrier. PSS/SSS6 illustrates an example of a second plurality of subcarriers located adjacent to and below the DC subcarrier. Considering the DC subcarrier as a reference point, the frequency locations of the 1st and 12th pairs (PSS/SSS1 and PSS/SSS12), 2nd and 11th pairs (PSS/SSS2 and PSS/SSS11), 3rd and 10th pairs (PSS/SSS3 and PSS/SSS10), 4th and 9th pairs (PSS/SSS4 and PSS/SSS9), 5th and 8th pairs (PSS/SSS5 and PSS/SSS8) and 6th and 7th pairs (PSS/SSS6 and PSS/SSS7) mirror each other around the DC subcarrier reference point, in terms of frequency location in the 15 MHz channel bandwidth.

Figure 10:
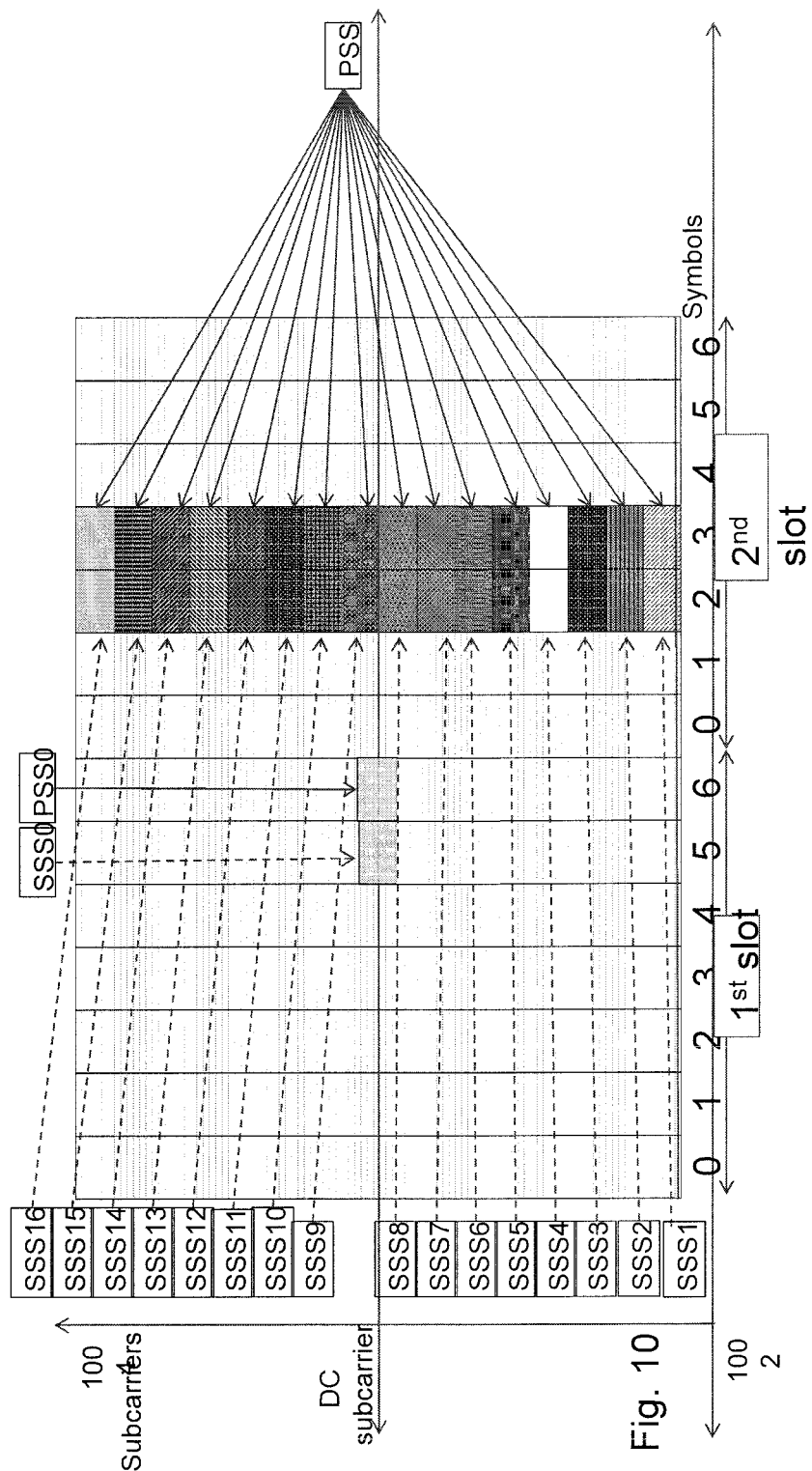

FIG. 10 illustrates two slots of an example subframe in a 20 MHz FDD system. Each slot comprises a plurality of OFDM symbols, illustrated on horizontal axis 1002, and a plurality of subcarriers, illustrated on vertical axis 1004. FIG. 10 includes sixteen additional PSS/SSS pairs.

In the illustrated embodiment, sixteen PSS/SSS pairs are inserted in symbols 2 and 3 of the second slot of either or both subframe 0 and 5. PSS/SSS9 illustrates an example of a first plurality of subcarriers located adjacent to and above the DC subcarrier. PSS/SSS8 illustrates an example of a second plurality of subcarriers located adjacent to and below the DC subcarrier. Considering the DC subcarrier as a reference point, the frequency locations of the 1st and 16th pairs (PSS/SSS1 and PSS/SSS16), 2nd and 15th pairs (PSS/SSS2 and PSS/SSS15), 3rd and 14th pairs (PSS/SSS3 and PSS/SSS14), 4th and 13th pairs (PSS/SSS4 and PSS/SSS13), 5th and 12th pairs (PSS/SSS5 and PSS/SSS12), 6th and 11th pairs (PSS/SSS6 and PSS/SSS11), 7th and 10th pairs (PSS/SSS7 and PSS/SSS10) and 8th and 9th pairs (PSS/SSS8 and PSS/SSS9) mirror each other around the DC subcarrier reference point, in terms of frequency location in the 20 MHz channel bandwidth.

In particular embodiments, if PSS/SSS pairs are inserted in any OFDM symbol which has CRS signals, the synchronization signals may be punctured in the positions where CRS are transmitted. For example in a one antenna port CRS configuration, if PSS/SSS pairs are located at OFDM symbols 3 and 4 of slot 1 of subframe 0 or 5 respectively, SSS signals may be punctured in the resource elements where CRS signals are transmitted.

Figure 11:
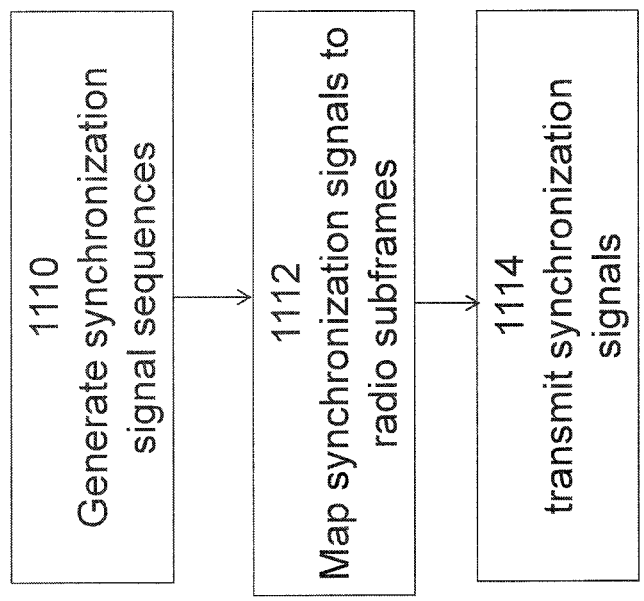
FIG. 11 is a flowchart of an example method for transmitting PSS and SSS, according to a particular embodiment.

FIG. 11 is a flowchart of an example method for transmitting PSS and SSS, according to a particular embodiment.

In particular embodiments, one or more steps of the method may be performed by components of network 100 described with reference to FIGS. 1-15.

The method begins at step 1110, where a network node generates synchronization signals. For example, radio network node 120 may generate a plurality of PSS sequences and SSS sequences. Each PSS sequence is paired with an SSS sequence to form a PSS/SSS pair. In particular embodiments, a first PSS sequence and a second PSS sequence may comprise identical sequences or may comprise different sequences. In particular embodiments, a first SSS sequence and a second SSS sequence may comprise identical sequences or may comprise different sequences.

At step 1112, the network node maps the synchronization signals to radio subframes. For example, radio network node 120 may map the plurality of PSS/SSS pairs to a subframe according to any one of the frame formats described above, such as those described with respect to FIGS. 6-10. In particular embodiments, the frame format may comprise both legacy cell search signals and cell search signals according to one of the formats described herein. In particular embodiments, radio network node 120 may map PSS/SSS pairs to more than one subframe or repeat a mapping or combination of mappings in multiple subframes.

At step 1114, the network node transmits the synchronization signals. For example, radio network node 120 transmits the radio frame comprising the subframes with the mapping of PSS/SSS pairs. In particular embodiments, radio network node 120 may perform directional signal transmission. For example, radio network node 120 may transmit a first PSS/SSS pair in a first direction and a second PSS/SSS pair in a second direction. In particular embodiments, radio network node 120 may transmit a first PSS/SSS pair in different directions over time.

Modifications, additions, or omissions may be made to the method of FIG. 11. Additionally, one or more steps in the method of FIG. 11 may be performed in parallel or in any suitable order. The method may be repeated as necessary over time.

Figure 12:
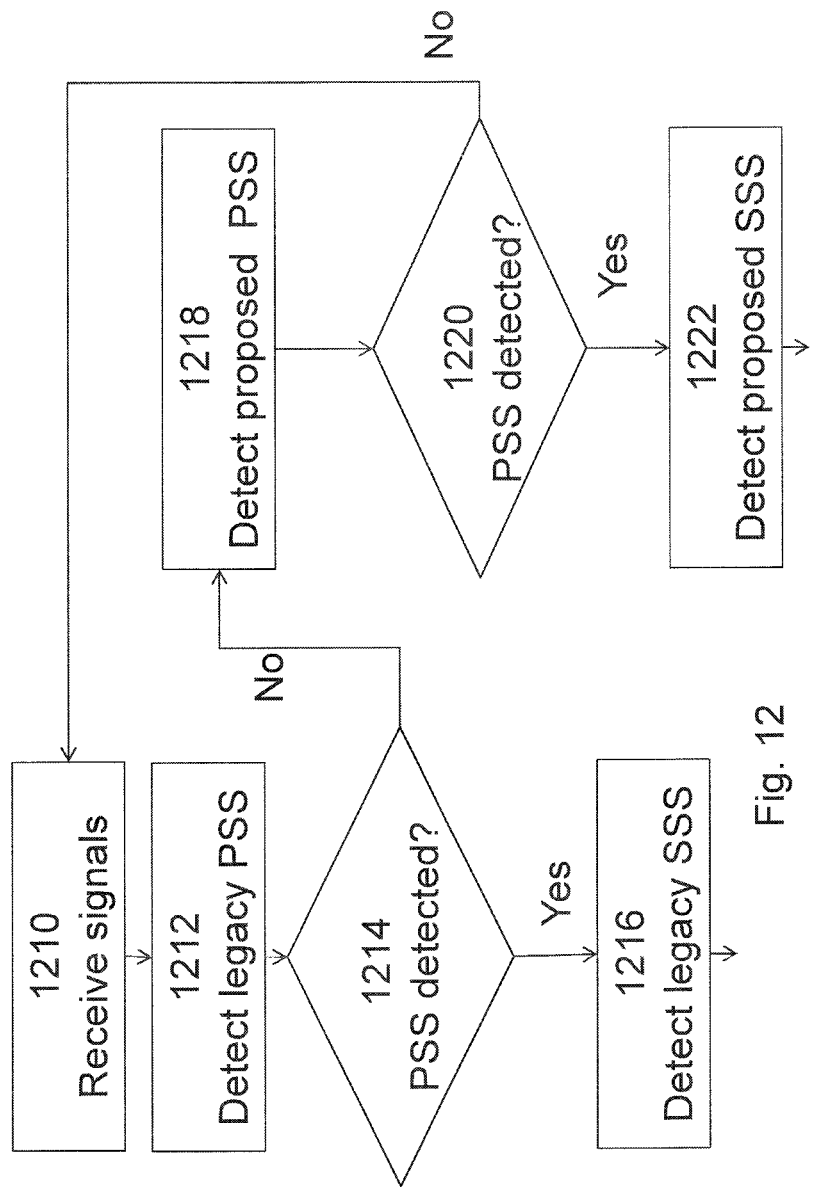
FIG. 12 is a flowchart of an example method for detecting PSS and SSS, according to a particular embodiment.

FIG. 12 is a flowchart of an example method for detecting PSS and SSS, according to a particular embodiment. In particular embodiments, one or more steps of the method may be performed by components of network 100 described with reference to FIGS. 1-15.

The method begins at step 1210, where a wireless device receives signals transmitted from a radio network node. For example, wireless device 110 may receive wireless signal 130 from radio network node 120. Wireless signal 130 may comprise primary and secondary cell search signals. For example, wireless signal 130 may comprise a plurality of PSS/SSS pairs 150 according to any one of the frame formats described above with respect to FIGS. 4-10. In particular embodiments, wireless signal 130 may comprise both legacy cell search signals and cell search signals according to one of the formats described herein.

At step 1212, the wireless device tries to detect a legacy PSS signal. If the wireless device detects a legacy PSS at step 1214, then the method continues to step 1216 where the wireless device tries to detect a legacy SSS signal.

After detecting both primary and secondary cell search signals, the method is complete. However, if the wireless device at step 1212 is unable to detect a legacy PSS signal (e.g., because the SINR is too low), then the method continues to step 1218. In particular embodiments, even if legacy PSS and SSS are detected the method may continue to step 1218. For example, if the wireless device is not confident that it detected the legacy PSS or SSS correctly, the wireless device may continue to step 1218. The wireless device may compare any PSS and SSS detected in steps 1218-1222 to determine the accuracy of the detected legacy PSS/SSS pair.

At step 1218, the wireless device tries to detect a PSS sequence, such as a PSS sequence according to one of the formats described herein. In particular embodiments, the wireless device may inspect subcarriers adjacent to the DC subcarrier in an attempt to detect the PSS sequence. If the wireless device successfully detects PSS, then the method continues to step 1222. If the wireless device does not successfully detect PSS, then the method returns to step 1210 where the wireless device continues to detect signals received from the radio network node. In particular embodiments, a PSS/SSS search method such as the one described below with reference to FIG. 13 may be used to search the frequency band for additional PSS/SCC pairs.

At step 1222, the wireless device tries to detect an SSS sequence according to one of the formats described herein. In particular embodiments, the wireless device may inspect subcarriers adjacent to the DC subcarrier in an attempt to detect the SSS sequence. In particular embodiments, the wireless device may inspect an OFDM symbol adjacent to the OFDM symbol in which the PSS was detected.

In some embodiments, the method is complete after detecting both primary and secondary cell search signals. In other embodiments, the wireless device may continue to detect additional PSS/SSS pairs.

In particular embodiments, wireless device 110 may accumulate multiple PSS/SSS pairs received within a subframe or received across multiple subframes. A particular advantage is that wireless device 110 may combine signals to create a stronger signal. In particular embodiments, radio network node 120 may transmit a first PSS/SSS pair in a first direction and a second PSS/SSS pair in a second direction. A particular advantage of this transmission method is that wireless device 110 may receive a stronger PSS/SSS pair when radio network node 120 transmits the PSS/SSS pair in the direction of wireless device 110.

Modifications, additions, or omissions may be made to the method of FIG. 12. Additionally, one or more steps in the method of FIG. 12 may be performed in parallel or in any suitable order. For example, steps 1212 and 1218 may be performed in parallel or reverse order. In particular embodiments, steps 1212 to 1216 may be omitted. The method may be repeated as necessary over time, such as when a wireless device travels into a new cell coverage area.

In particular embodiments, a receiver may attempt to detect PSS and SSS in all possible resource block intervals corresponding to the maximum system bandwidth. This may require a UE with large processing capacity such that the UE can process several PSS resource block pair intervals simultaneously. When PSS is detected for one resource block pair interval, then the UE may continue to detect SSS in the same resource block pair interval, but with a received signal corresponding to another OFDM symbol. A less resource intensive embodiment is illustrated in FIG. 13.

FIG. 13 illustrates an example method of detecting a PSS/SSS pair in a 10 MHz system. Resource block intervals 1310a to 1310h represent resource blocks mapped to a PSS/SSS pair, such as those described with reference to FIGS. 6-10 above.

In particular embodiments, a UE may start at first search 1302 by searching for two central resource block pair intervals, such as resource block intervals 1310a and 1310b. Resource block interval 1310a may be located 6 resource blocks above the DC subcarrier. Resource block interval 1310*b* may be located 6 resource blocks below the DC subcarrier.

In this example embodiment, a UE may only need processing capacity to handle two simultaneous resource block pair intervals. If the UE cannot perform a successful detection at first search 1302, the UE may continue to second search 1304.

At second search 1304, the UE may change the detection for the next two resource block pair intervals to the ones adjacent to the previously evaluated pair, such as resource block intervals 1310*c* and 1310*d*. This expansion of search intervals may be continued, for example to third search 1306, fourth search 1308, and so on until the UE has detected the PSS and SSS signals.

Although particular PSS/SSS patterns are illustrated herein, additional patterns will be apparent to those skilled in the art. Furthermore, any of the patterns described above, or combination of patterns, may be repeated in other subframes within the frame.

FIG. 14 is a block diagram illustrating an example embodiment of a wireless device. The wireless device is an example of the wireless devices 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 1410, processor 1420, and memory 1430. In some embodiments, transceiver 1410 facilitates transmitting wireless signals to and receiving wireless signals from wireless network node 120 (e.g., via an antenna), processor 1420 executes instructions to provide some or all of the functionality described herein as provided by the wireless device, and memory 1430 stores the instructions executed by processor 1420.

Processor 1420 includes any suitable combination of hardware and software implemented in one or more integrated circuits or modules to execute instructions and manipulate data to perform some or all of the described functions of the wireless device. Memory 1430 is generally operable to store computer executable code and data. Examples of memory 1430 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1420 in communication with transceiver 1410 receives cell search signals from radio network node 120. Other embodiments of the wireless device may include additional components (beyond those shown in FIG. 14) responsible for providing certain aspects of the wireless device's functionality, including any of the functionality described above and/or any additional functionality (including any functionality necessary to support the solution described above).

FIG. 15 is a block diagram illustrating an example embodiment of a radio network node. Radio network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Radio network node 120 includes at least one transceiver 1510, at least one processor 1520, at least one memory 1530, and at least one network interface 1540. Transceiver 1510 facilitates transmitting wireless signals to and receiving wireless signals from a wireless device, such as wireless devices 110 (e.g., via an antenna); processor 1520 executes instructions to provide some or all of the functionality described above as being provided by a radio network node 120; memory 1530 stores the instructions executed by processor 1520; and network interface 1540 communicates signals to backend network components, such as a gateway, switch, router, Internet, Public Switched Telephone Network (PSTN), controller, and/or other radio network nodes 120. Processor 1520 and memory 1530 can be of the same types as described with respect to processor 1420 and memory 1430 of FIG. 14 above.

In some embodiments, network interface 1540 is communicatively coupled to processor 1520 and refers to any suitable device operable to receive input for radio network node 120, send output from radio network node 120, perform suitable processing of the input or output or both, communicate to other devices, or any combination of the preceding. Network interface 1540 includes appropriate hardware (e.g., port, modem, network interface card, etc.) and software, including protocol conversion and data processing capabilities, to communicate through a network.

In particular embodiments, processor 1520 in communication with transceiver 1510 transmits, to wireless device 110, cell search signals. In particular embodiments, processor 1520 in communication with transceiver 1510 transmits sell search signals such as the PSS and SSS described above to wireless device 110.

Other embodiments of radio network node 120 include additional components (beyond those shown in FIG. 15) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, in some embodiments, the methods and apparatus disclosed herein may facilitate detecting synchronization signals in a low SINR environment. Cell search procedure may be performed more efficiently to improve overall system performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
CDMA2000 Code division multiple access 2000
CP Cyclic Prefix
CRS Cell-Specific Reference Signal
eNB Enhanced Node-B
ePDCCH Enhance Physical Downlink Control Channel
FDD Frequency Division Duplex
GSM Global System for Mobile communication
HSPA High Speed Packet Access
LTE Long Term Evolution
MIMO Multi-Input Multi-Output
OFDM Orthogonal Frequency-Division Multiplexing
PBCH Physical Broadcast Channel
PCFICH Physical Control Format Indicator Channel
PDCCH Physical Downlink Control Channel
PDSCH Physical Downlink Shared Channel
ppm Part Per Million
PSS Primary Synchronization Signal
PRACH Physical Random Access Channel
RE Resource Element
RB Resource Block
SINR Signal to Interference and Noise Ratio
SNR Signal to Noise Ratio
SSS Secondary Synchronization Signal
TDD Time Division Duplexing
UE User Equipment
UMTS Universal Mobile Telecommunications System
WiMAX Worldwide Interoperability for Microwave Access

The invention claimed is:

1. A method of synchronizing a wireless device with a network node, the method comprising:
receiving, at the wireless device, a radio subframe transmitted from the network node, the radio subframe comprising:
a first Primary Synchronization Signal (PSS) associated with a first Orthogonal Frequency Division Multiplexing (OFDM) symbol and a first plurality of subcarriers, the first PSS paired with a first Secondary Synchronization Signal (SSS) associated with a second OFDM symbol and the first plurality of subcarriers; and
a second PSS associated with the first OFDM symbol and a second plurality of subcarriers, the second PSS paired with a second SSS associated with the second OFDM symbol and the second plurality of subcarriers;
inspecting the first plurality of subcarriers to detect the first PSS and the first SSS;
inspecting the second plurality of subcarriers to detect the second PSS and the second SSS; and
upon detecting at least one of the first PSS and the first SSS or the second PSS and the second SSS, determining system information associated with the network node based on the detected at least one PSS and the detected at least one SSS.

2. The method of claim 1, wherein the first and second OFDM symbols do not include OFDM symbols reserved for Physical Downlink Control Channel (PDCCH).

3. The method of claim 1, wherein the first and second plurality of subcarriers of the first and second OFDM symbols do not include time-frequency resource elements that include Cell Reference Signals (CRS).

4. The method of claim 1, wherein a CRS time-frequency resource element punctures at least one of the first PSS, the second PSS, the first SSS, and the second SSS.

5. The method of claim 1, further comprising:
upon detecting the first PSS and the first SSS and the second PSS and the second SSS:
accumulating the first PSS and the second PSS and the first SSS and the second SSS; and
determining system information associated with the network node based on the accumulated first PSS and second PSS and the accumulated first SSS and second SSS.

6. The method of claim 1, wherein:
the radio subframe comprises subcarriers centered around a direct current (DC) subcarrier;
the first plurality of subcarriers comprise a plurality of subcarriers adjacent to and above the DC subcarrier; and
the second plurality of subcarriers comprises a plurality of subcarriers adjacent to and below the DC subcarrier.

7. The method of claim 1, the radio subframe further comprising:
a third PSS associated with the first OFDM symbol and a third plurality of subcarriers, the third PSS paired with a third SSS associated with the second OFDM symbol and the third plurality of subcarriers; and
a fourth PSS associated with the first OFDM symbol and a fourth plurality of subcarriers, the fourth PSS paired with a fourth SSS associated with the second OFDM symbol and the fourth plurality of subcarriers; and
the method further comprising:
inspecting the third plurality of subcarriers to detect the third PSS and the third SSS;
inspecting the fourth plurality of subcarriers to detect the fourth PSS and the fourth SSS; and
upon detecting at least one of the third PSS and the third SSS or the fourth PSS and the fourth SSS, determining system information associated with the network node based on the detected at least one PSS and the detected at least one SSS.

8. A method of transmitting synchronization signals in a wireless network, the method comprising:
generating a first Primary Synchronization Signal (PSS) and a second PSS;
generating a first Secondary Synchronization Signal (SSS) and a second SSS;
mapping the first PSS, first SSS, second PSS, and second SSS to a radio subframe, wherein:
the first PSS is associated with a first Orthogonal Frequency Division Multiplexing (OFDM) symbol and a first plurality of subcarriers, the first PSS paired with the first SSS associated with a second OFDM symbol and the first plurality of subcarriers;
the second PSS is associated with the first OFDM symbol and a second plurality of subcarriers, the second PSS paired with the second SSS associated with the second OFDM symbol and the second plurality of subcarriers; and
transmitting the radio subframe.

9. The method of claim 8, further comprising transmitting the first PSS and the first SSS in a first direction and the second PSS and the second SSS in a second direction.

10. The method of claim 8, wherein:
the radio subframe comprises subcarriers centered around a direct current (DC) subcarrier;

the first plurality of subcarriers comprise a plurality of subcarriers located adjacent to and above the DC subcarrier; and the second plurality of subcarriers comprises a plurality of subcarriers located adjacent to and below the DC subcarrier.

11. A wireless device comprising a processor operable to:
receive a radio subframe transmitted from a network node, the radio subframe comprising:
a first Primary Synchronization Signal (PSS) associated with a first Orthogonal Frequency Division Multiplexing (OFDM) symbol and a first plurality of subcarriers, the first PSS paired with a first Secondary Synchronization Signal (SSS) associated with a second OFDM symbol and the first plurality of subcarriers; and
a second PSS associated with the first OFDM symbol and a second plurality of subcarriers, the second PSS paired with a second SSS associated with the second OFDM symbol and the second plurality of subcarriers;
inspect the first plurality of subcarriers to detect the first PSS and the first SSS;
inspect the second plurality of subcarriers to detect the second PSS and the second SSS; and
upon detecting at least one of the first PSS and the first SSS or the second PSS and the second SSS, determine system information associated with the network node based on the detected at least one PSS and the detected at least one SSS.

12. The wireless device of claim 11, wherein a CRS time-frequency resource element punctures at least one of the first PSS, the second PSS, the first SSS, and the second SSS.

13. The wireless device of claim 11, wherein the first PSS and the first SSS are associated with adjacent OFDM symbols.

14. The wireless device of claim 11, wherein the first PSS is transmitted before the first SSS.

15. The wireless device of claim 11, the processor further operable to:
upon detecting the first PSS and the first SSS and the second PSS and the second SSS:
accumulate the first PSS and the second PSS and the first SSS and the second SSS; and
determine system information associated with the network node based on the accumulated first PSS and second PSS and the accumulated first SSS and second SSS.

16. The wireless device of claim 11, wherein:
the radio subframe comprises subcarriers centered around a direct current (DC) subcarrier;
the first plurality of subcarriers comprise a plurality of subcarriers adjacent to and above the DC subcarrier; and the second plurality of subcarriers comprises a plurality of subcarriers adjacent to and below the DC subcarrier.

17. The wireless device of claim 11, the radio subframe further comprising:
a third PSS associated with the first OFDM symbol and a third plurality of subcarriers, the third PSS paired with a third SSS associated with the second OFDM symbol and the third plurality of subcarriers; and
a fourth PSS associated with the first OFDM symbol and a fourth plurality of subcarriers, the fourth PSS paired with a fourth SSS associated with the second OFDM symbol and the fourth plurality of subcarriers; and
the processor further operable to:
inspect the third plurality of subcarriers to detect the third PSS and the third SSS;
inspect the fourth plurality of subcarriers to detect the fourth PSS and the fourth SSS; and
upon detecting at least one of the third PSS and the third SSS or the fourth PSS and the fourth SSS, determine system information associated with the network node based on the detected at least one PSS and the detected at least one SSS.

18. A network node comprising a processor operable to:
generate a first Primary Synchronization Signal (PSS) and a second PSS;
generate a first Secondary Synchronization Signal (SSS) and a second SSS;
map the first PSS, first SSS, second PSS, and second SSS to a radio subframe, wherein:
the first PSS is associated with a first Orthogonal Frequency Division Multiplexing (OFDM) symbol and a first plurality of subcarriers, the first PSS paired with the first SSS associated with a second OFDM symbol and the first plurality of subcarriers;
the second PSS is associated with the first OFDM symbol and a second plurality of subcarriers, the second PSS paired with the second SSS associated with the second OFDM symbol and the second plurality of subcarriers; and
transmit the radio subframe.

19. The network node of claim 18, wherein the processor is further operable to transmit the first PSS and the first SSS in a first direction and the second PSS and the second SSS in a second direction.

20. The network node of claim 18, wherein:
the radio subframe comprises subcarriers centered around a direct current (DC) subcarrier;
the first plurality of subcarriers comprise a plurality of subcarriers located adjacent to and above the DC subcarrier; and
the second plurality of subcarriers comprises a plurality of subcarriers located adjacent to and below the DC subcarrier.

* * * * *